United States Patent
Cecala et al.

(10) Patent No.: US 7,164,791 B2
(45) Date of Patent: Jan. 16, 2007

(54) METHOD AND COMPUTER PROGRAM PRODUCT FOR IDENTIFYING AND INCORPORATING NEW OUTPUT CLASSES IN A PATTERN RECOGNITION SYSTEM DURING SYSTEM OPERATION

(75) Inventors: Joseph F. Cecala, Endwell, NY (US); Rosemary D. Paradis, Vestal, NY (US); Elliott D. Reitz, II, Bradenton, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 737 days.

(21) Appl. No.: 10/208,447

(22) Filed: Jul. 30, 2002

(65) Prior Publication Data

US 2004/0022441 A1 Feb. 5, 2004

(51) Int. Cl.
*G06K 9/62* (2006.01)
(52) U.S. Cl. ..................................... 382/159
(58) Field of Classification Search ................ 382/225, 382/159
See application file for complete search history.

(56) References Cited

U.S. PATENT DOCUMENTS

| | | | | |
|---|---|---|---|---|
| 4,481,665 A | * | 11/1984 | Ota | ........................... 382/102 |
| 4,736,441 A | | 4/1988 | Hirose et al. | |
| 5,077,807 A | * | 12/1991 | Bokser | ........................ 382/160 |
| 5,303,311 A | * | 4/1994 | Epting et al. | ................ 382/197 |
| 5,386,482 A | | 1/1995 | Basso et al. | |
| 5,537,488 A | * | 7/1996 | Menon et al. | ............... 382/170 |
| 5,737,438 A | | 4/1998 | Zlotnick et al. | |
| 5,852,685 A | * | 12/1998 | Shepard | ...................... 382/311 |
| 5,881,172 A | | 3/1999 | Pintsov | |
| 6,014,450 A | | 1/2000 | Heilper et al. | |
| 6,148,106 A | | 11/2000 | Impagliazzo | |

* cited by examiner

*Primary Examiner*—Joseph Mancuso
*Assistant Examiner*—Jonathan Schaffer
(74) *Attorney, Agent, or Firm*—Tarolli, Sundheim, Covell & Tummino LLP

(57) ABSTRACT

The present invention recites a method and computer program product for identifying one or more new pattern classes and incorporating the classes into a pattern recognition classifier as output classes. A plurality of input patterns determined not to be associated with any of a set of at least one represented output class by a pattern recognition classifier are rejected. The rejected pattern samples are then grouped into clusters according to the similarities between the pattern samples. Clusters that represent new pattern classes are identified via independent review. The classifier is then retrained to include the new pattern classes as output classes.

20 Claims, 3 Drawing Sheets

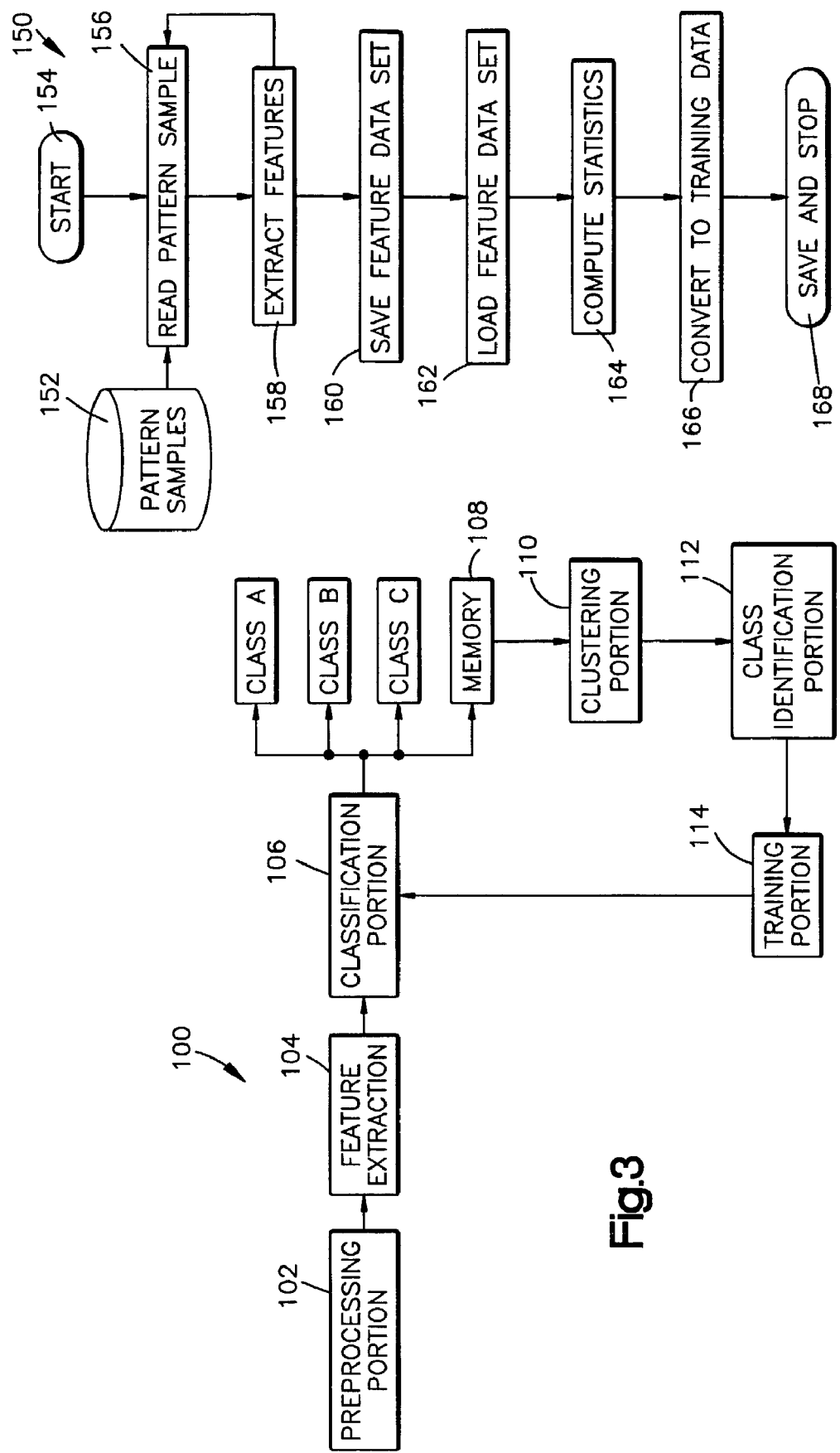

METHOD AND COMPUTER PROGRAM PRODUCT FOR IDENTIFYING AND INCORPORATING NEW OUTPUT CLASSES IN A PATTERN RECOGNITION SYSTEM DURING SYSTEM OPERATION

BACKGROUND OF THE INVENTION

1. Technical Field

The invention relates to a system for locating and incorporating new classes in a pattern recognition device or classifier. Image processing systems often contain pattern recognition devices (classifiers).

2. Description of the Prior Art

Pattern recognition systems, loosely defined, are systems capable of distinguishing between various classes of real world stimuli according to their divergent characteristics. A number of applications require pattern recognition systems, which allow a system to deal with unrefined data without significant human intervention. By way of example, a pattern recognition system may attempt to classify individual letters to reduce a handwritten document to electronic text. Alternatively, the system may classify spoken utterances to allow verbal commands to be received at a computer console.

A typical prior art classifier is trained over a plurality of output classes using a set of training samples. The training samples are processed, data relating to features of interest are extracted, and training parameters are derived from this feature data. As the system receives an input associated with one of a plurality of classes, it analyzes its relationship to each class via a classification technique based upon these training parameters. From this analysis, the system produces an output class and an associated confidence value.

In some applications, such as optical character recognition, the output classes stay substantially the same. In many others, however, new output classes often appear in the population of samples classified by the system. For these applications, it is frequently necessary to add new output classes to reflect changes in the data population. Similarly, over a period of operation, the classifier will be exposed to various noise patterns. In many cases, these noise patterns will be uncommon, and the system will deal with them appropriately by rejecting them. For many applications, however, particular noise patterns may reoccur. In such a case, dealing with this reoccurring pattern as a separate class will allow the system to identify and reject a significant source of unclassifiable patterns.

Absent some method of identifying new classes and reoccurring noise, the system will not be able to deal with the novel patterns effectively. This problem will continue until the new output class or reoccurring noise pattern is discovered by an operator. Accordingly, a number of input patterns will be classified incorrectly prior to discovery of the new class. It would be desirable to have a system that is capable of collecting and grouping reoccurring patterns to allow new output or noise classes to be identified.

SUMMARY OF THE INVENTION

In accordance with one aspect of the present invention, a method is disclosed for identifying one or more new pattern classes and incorporating the classes into a pattern recognition classifier as output classes. A plurality of input patterns determined not to be associated with any of a set of at least one represented output class by a pattern recognition classifier are rejected. The rejected pattern samples are then grouped into clusters according to the similarities between the pattern samples. Clusters that represent new pattern classes are identified via independent review. The classifier is then retrained to include the new pattern classes as output classes.

In accordance with another aspect of the invention, a computer program product is disclosed for identifying one or more new pattern classes and incorporating the pattern classes into a pattern recognition classifier as output classes. A classification portion rejects a plurality of input patterns determined not to be associated with any of a set of at least one represented output class. A clustering portion then groups the rejected pattern samples into clusters according to the similarities between the pattern samples. Clusters representing new pattern classes are identified by a class identification portion via an independent review. A training portion then retrains the classifier to include the new pattern classes as output classes.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a functional diagram of a postal indicia recognition system incorporating an example embodiment of the present invention;

FIG. 4 is a flow diagram illustrating the training of a classifier compatible with the present invention.

DETAILED DESCRIPTION OF THE INVENTION

In accordance with the present invention, a method for identifying and including unknown output classes in a pattern recognition classifier is described. The method may be applied to classifiers used in any traditional pattern recognition classifier task, including, for example, optical character recognition (OCR), speech translation, and image analysis in medical, military, and industrial applications.

It should be noted that a pattern recognition classifier to which the present invention may be applied will typically be implemented as a computer program, preferably a program simulating, at least in part, the functioning of a neural network. Accordingly, understanding of the present invention will be facilitated by an understanding of the operation and structure of a neural network.

Figure 1:
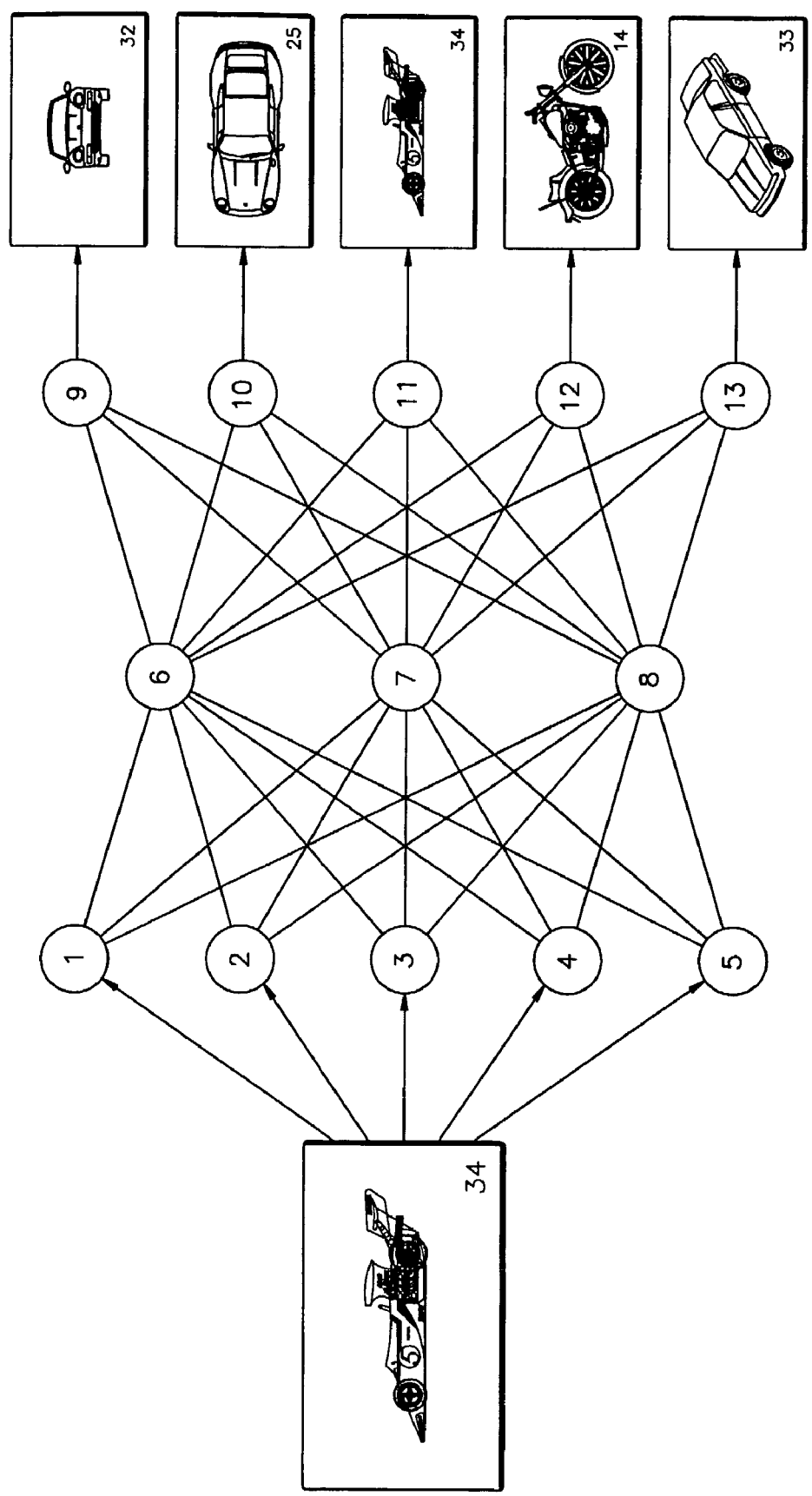
FIG. 1 is an illustration of an exemplary neural network utilized for pattern recognition.

FIG. 1 illustrates a neural network that might be used in a pattern recognition task. The illustrated neural network is a three-layer back-propagation neural network used in a pattern classification system. It should be noted here, that the neural network illustrated in FIG. 1 is a simple example solely for the purposes of illustration. Any non-trivial application involving a neural network, including pattern classification, would require a network with many more nodes in each layer. In addition, additional hidden layers might be required.

In the illustrated example, an input layer comprises five input nodes, 1–5. A node, generally speaking, is a processing unit of a neural network. A node may receive multiple inputs from prior layers which it processes according to an internal formula. The output of this processing may be provided to multiple other nodes in subsequent layers. The functioning of nodes within a neural network is designed to mimic the function of neurons within a human brain.

Each of the five input nodes 1–5 receives input signals with values relating to features of an input pattern. By way of example, the signal values could relate to the portion of an image within a particular range of grayscale brightness. Alternatively, the signal values could relate to the average frequency of a audio signal over a particular segment of a recording. Preferably, a large number of input nodes will be used, receiving signal values derived from a variety of pattern features.

Each input node sends a signal to each of three intermediate nodes 6–8 in the hidden layer. The value represented by each signal will be based upon the value of the signal received at the input node. It will be appreciated, of course, that in practice, a classification neural network may have a number of hidden layers, depending on the nature of the classification task.

Each connection between nodes of different layers is characterized by an individual weight. These weights are established during the training of the neural network. The value of the signal provided to the hidden layer by the input nodes is derived by multiplying the value of the original input signal at the input node by the weight of the connection between the input node and the intermediate node. Thus, each intermediate node receives a signal from each of the input nodes, but due to the individualized weight of each connection, each intermediate node receives a signal of different value from each input node. For example, assume that the input signal at node 1 is of a value of 5 and the weight of the connection between node 1 and nodes 6–8 are 0.6, 0.2, and 0.4 respectively. The signals passed from node 1 to the intermediate nodes 6–8 will have values of 3, 1, and 2.

Each intermediate node 6–8 sums the weighted input signals it receives. This input sum may include a constant bias input at each node. The sum of the inputs is provided into an transfer function within the node to compute an output. A number of transfer functions can be used within a neural network of this type. By way of example, a threshold function may be used, where the node outputs a constant value when the summed inputs exceed a predetermined threshold. Alternatively, a linear or sigmoidal function may be used, passing the summed input signals or a sigmoidal transform of the value of the input sum to the nodes of the next layer.

Regardless of the transfer function used, the intermediate nodes 6–8 pass a signal with the computed output value to each of the nodes 9–13 of the output layer. An individual intermediate node (i.e. 7) will send the same output signal to each of the output nodes 9-13, but like the input values described above, the output signal value will be weighted differently at each individual connection. The weighted output signals from the intermediate nodes are summed to produce an output signal. Again, this sum may include a constant bias input.

Each output node represents an output class of the classifier. The value of the output signal produced at each output node represents the probability that a given input sample belongs to the associated class. In the example system, the class with the highest associated probability is selected, so long as the probability exceeds a predetermined threshold value. The value represented by the output signal is retained as a confidence value of the classification.

Figure 2:
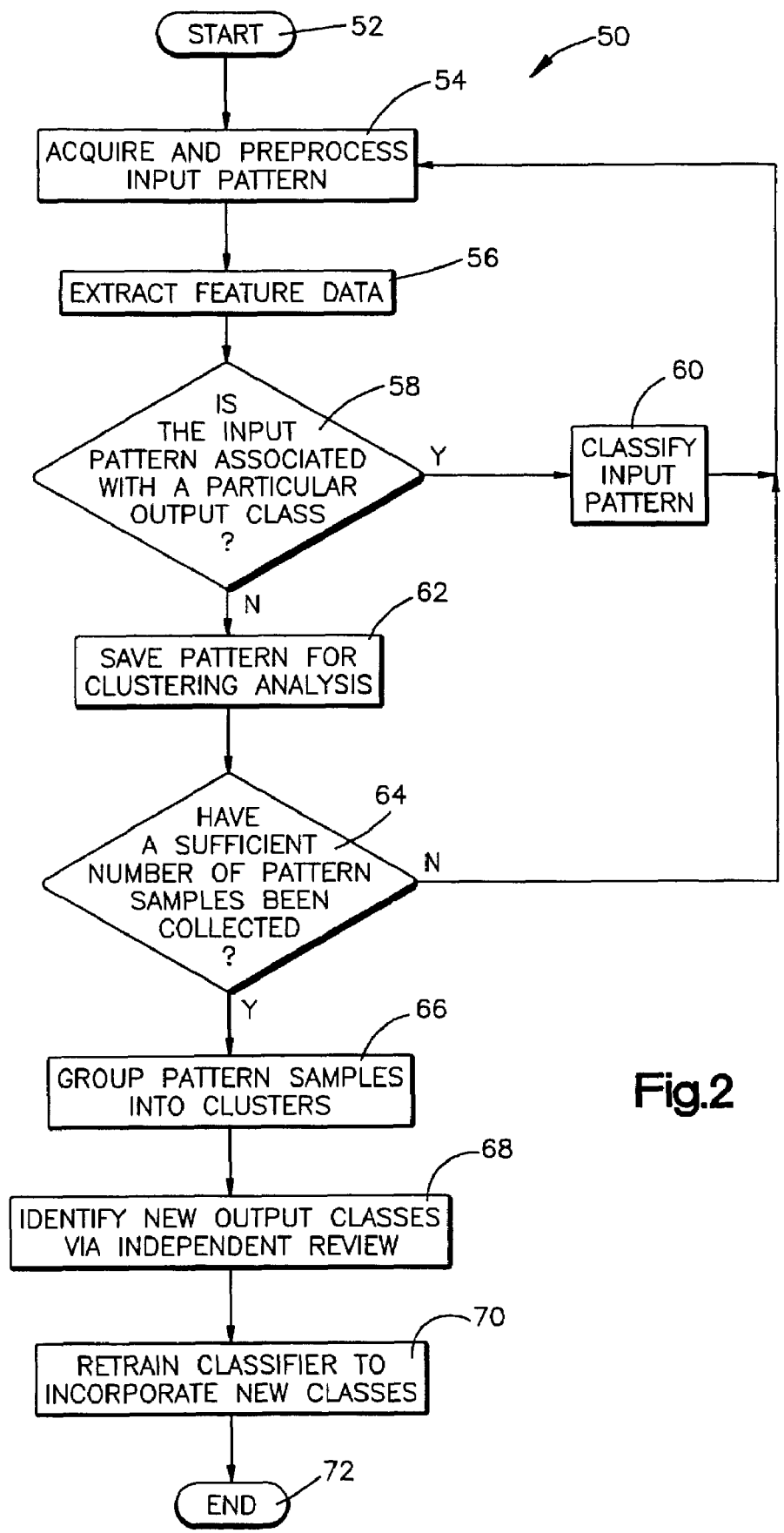
FIG. 2 is a flow diagram illustrating the operation of a pattern recognition system incorporating the present invention.

FIG. 2 is a flow diagram illustrating the present invention in the context of a pattern recognition system representing at least one output class. As stated above, the present invention and any associated classification system are will likely be implemented, at least in part, as software programs. Therefore, the structures described herein may be considered to refer to individual modules and tasks within these programs.

The process 50 begins at step 52 and proceeds to step 54, where an input pattern is acquired and preprocessed. During preprocessing, the pattern is enhanced, portions of interest are located, and obvious noise is eliminated. Other alterations to the input pattern may be made to prepare the pattern for further processing.

The process then proceeds to step 56, where feature data is extracted from the pattern. Feature extraction converts the pattern into a vector of numerical measurements, referred to as feature variables. Thus, the feature vector represents the pattern in a compact form. The vector is formed from a sequence of measurements performed on the pattern. Many feature types exist and are selected based on the characteristics of the recognition problem.

The process then advances to step 58, where the system determines if the input pattern is associated with an output class represented by the system. This determination will vary depending on the classification technique used. If the system determines that the input pattern is associated with a represented output class, the process proceeds to step 60, where the system outputs the classification result and returns to step 54 to process another input pattern.

If the input pattern is rejected (i.e. not determined to be associated with a particular class), the process advances to step 62, where the pattern is stored in memory. The process then advances to step 64, where the system determines if a sufficient number of samples have been collected to conduct a clustering analysis. If an insufficient number of samples have been collected, the system returns to step 54 to process another pattern.

If a sufficient number of pattern samples have been collected, the process proceeds to step 66, where the collected patterns are grouped into clusters according to their proximity in feature space. In other words, patterns possessing similar features are grouped together, according to a clustering algorithm. A number of clustering algorithms exist for use in this application, including k-means algorithms, gradient search techniques, and similar optimization techniques.

The process then advances to step 68, where the clusters are subjected to independent review to identify new pattern classes. In a preferred embodiment, the clustered pattern data is outputted to a human operator for review. Alternatively, the clustering may be verified by a computerized process, such as a modified clustering algorithm. It should be noted that not all of the new classes discovered by this process will be classes of interest within the application. Some of the new classes will merely consist of noise patterns that appear frequently within the classification process. The addition of such noise classes will allow the system to quickly classify the patterns as noise and enhance system performance.

The process then proceeds to step 70, where the pattern samples are used to retrain the classifier. After training, the classifier will be able to recognize patterns associated with the newly identified classes. This allows the classifier to adjust to changes within the population of samples and to quickly identify and eliminate common noise patterns. The process then terminates at step 72.

FIG. 3 illustrates an example embodiment of a postal indicia recognition system 100 incorporating the present invention. At the preprocessing portion 102, an input image is obtained and extraneous portions of the image are eliminated. In the example embodiment, the system locates any potential stamps within the envelope image. The image is segmented to isolate the stamps into separate images and extraneous portions of the stamp images are cropped. Any rotation of the stamp image is corrected to a standard orientation. The preprocessing portion 102 then creates an image representation of reduced size to facilitate feature extraction.

The preprocessed pattern segment is then passed to a feature extraction portion 104. The feature extraction portion 104 analyzes preselected features of the pattern. The selected features can be literally any values derived from the pattern that vary sufficiently among the various output classes to serve as a basis for discriminating among them. Numerical data extracted from the features can be conceived for computational purposes as a feature vector, with each element of the vector representing a value derived from one feature within the pattern. Features can be selected by any reasonable method, but typically, appropriate features will be selected by experimentation. In the preferred embodiment of a postal indicia recognition system, a thirty-two element feature vector is used, including sixteen histogram feature values, and sixteen "Scaled 16" feature values.

A scanned grayscale image consists of a number of individual pixels, each possessing an individual level of brightness, or grayscale value. The histogram portion of the feature vector focuses on the grayscale value of the individual pixels within the image. Each of the sixteen histogram variables represents a range of grayscale values. The values for the histogram feature variables are derived from a count of the number of pixels within the image having a grayscale value within each range. By way of example, the first histogram feature variable might represent the number of pixels falling within the lightest sixteenth of the range all possible grayscale values.

The "Scaled 16" variables represent the average grayscale values of the pixels within sixteen preselected areas of the image. By way of example, the sixteen areas may be defined by a four by four equally spaced grid superimposed across the image. Thus, the first variable would represent the average or summed value of the pixels within the upper left region of the grid.

The extracted feature vector is then inputted into a classification portion 106. At the classification portion, the feature vector is compared to training data from a number of output classes. A variety of classifier architectures and techniques may be selected for making this determination. In the example embodiment, for the sake of simplicity, the classification portion 106 makes use of a Bayesian Mahalanobis distance classification system.

The classification portion attempts to match the input feature vector to one of a plurality of represented classes using the selected classification technique. In this process, a class will be selected and a corresponding confidence measurement will be calculated. If the confidence measurement is above a predetermined threshold, the feature vector is classified as the corresponding class. If the confidence measurement does not exceed the threshold, the feature vectors are stored in a memory 108 for later analysis.

Once a sufficient number of image samples have been accumulated, the image samples are passed to a clustering portion 110. The clustering portion 110 groups the image samples into clusters based upon similarities in their features. More precisely, the clustering portion 110 groups together those images whose feature vectors are relatively close to one another within an N-dimensional space, where each of the N dimensions represents a feature variable. A number of clustering algorithms exist for this purpose, including, for example, nearest neighbor clustering, gradient trace techniques, and k-means clustering. In the example embodiment, a type of genetic clustering algorithm is used for the initial clustering. Genetic clustering techniques are well-known in the art.

The clustered image samples are sent to a class identification portion 112, where the classes represented by the image clusters are identified via independent review. This independent review of the clustering process can be accomplished by a number of methods, ranging from computerized review, such as review by a customized clustering algorithm, to identification of the new classes by a human operator. In the example embodiment, the clustering is reviewed by a human operator, who identifies the new classes represented by the clusters and determines the image samples belonging to each new class. After the classes are identified, the newly classified image samples are passed to a training portion 114.

The training portion 114 retrains the original classifier to recognize the classes identified by the class identification portion 112. Training the classifier to recognize the new classes will allow the classifier to adjust to changes within the population of samples and to quickly identify and eliminate common noise patterns. In a preferred embodiment, this training can be accomplished without disturbing the operation of the original classifier, allowing new output classes to be added without disturbing the operation of the classifier.

FIG. 4 is a flow diagram illustrating the operation of a computer program 150 used to train a pattern recognition system via computer software. A number of pattern samples 152 are generated or collected from a population of real-world patterns. The number of pattern samples necessary for training varies with the application. The number of output classes, the selected features, and the nature of the classification technique used directly affect the number of samples needed for good results for a particular classification system. While the use of too few images can result in an improperly trained classifier, the use of too many samples can be equally problematic, as it can take too long to process the training data without a significant gain in performance.

The actual training process begins at step 154 and proceeds to step 156. At step 156, the program retrieves a pattern sample from memory. The process then proceeds to step 158, where the pattern sample is converted into a feature vector input similar to those a classifier would see in normal run-time operation. After each sample feature vector is extracted, the results are stored in memory, and the process returns to step 156. After all of the samples are analyzed, the process proceeds to step 160, where the feature vectors are saved to memory as a set.

The actual computation of the training data begins in step 162, where the saved feature vector set is loaded from memory. After retrieving the feature vector set, the process progresses to step 164. At step 164, the program calculates statistics, such as the mean and standard deviation of the feature variables for each class. Intervariable statistics may also be calculated, including a covariance matrix of the sample set for each class. The process then advances to step 166 where it uses the set of feature vectors to compute the training data. At this step in the example embodiment, an inverse covariance matrix is calculated, as well as any fixed value terms needed for the classification process. After these calculations are performed, the process proceeds to step 168 where the training parameters are stored in memory and the training process ends.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A method for identifying one or more new pattern classes and incorporating the classes into a pattern recognition classifier as output classes, comprising:
   providing a plurality of input patterns having no known class affiliation to the pattern recognition classifier;
   rejecting a subset of the plurality of input patterns that are determined not to be associated with any of a set of at least one represented output class by a pattern recognition classifier;
   grouping the rejected pattern samples into clusters according to their proximity in a feature space associated with the pattern recognition classifier;
   identifying clusters that represent new output classes via independent review; and
   retraining the classifier to include the new pattern classes as output classes.

2. A method as set forth in claim 1, wherein the step of identifying clusters representing new output classes includes subjecting the clustered pattern samples to a computerized verification process.

3. A method as set forth in claim 1, wherein the step of identifying clusters representing new output classes includes outputting them to a human operator.

4. A method as set forth in claim 1, wherein the plurality of input patterns include scanned images.

5. A method as set forth in claim 4, wherein at least one of the represented output classes represents a variety of postal indicia.

6. A method as set forth in claim 4, wherein at least one of the represented output classes represents an alphanumeric character.

7. A computer program product, operative in a data processing system and implemented on a computer readable medium, for identifying one or more new pattern classes and incorporating the pattern classes into a pattern recognition classifier as output classes, comprising:
   a classification portion that receives a plurality of input patterns having no known class affiliation and rejects a subset of the plurality of input patterns that are determined not to be associated with any of a set of at least one represented output class;
   a clustering portion that groups the rejected pattern samples into clusters according to their proximity in a feature space associated with the pattern recognition classifier;
   a class identification portion that identifies clusters that represent new output classes via an independent review; and
   a training portion that retrains the classifier to include the new pattern classes as output classes.

8. A computer program product as set forth in claim 7, wherein the class identification portion submits the grouped pattern samples to a computerized verification process.

9. A computer program product as set forth in claim 7, wherein the class identification portion outputs the grouped pattern samples to a human operator.

10. A computer program product as set forth in claim 7, wherein the plurality of input patterns include scanned images.

11. A computer program product as set forth in claim 10, wherein at least one of the represented output classes represents a variety of postal indicia.

12. A computer program product as set forth in claim 10, wherein at least one of the represented output classes represents an alphanumeric character.

13. A method for identifying new pattern classes and incorporating the classes into a pattern recognition classifier as output classes:
   classifying a plurality of input patterns at the pattern recognition classifier such that each of the plurality of input patterns is assigned to one of an output class from a plurality of output classes associated with the pattern recognition classifier and set of rejected input patterns;
   executing a clustering algorithm to assign the set of rejected input patterns to at least one cluster according to their proximity in a multidimensional feature space associated with the pattern recognition classifier;
   identifying at least one cluster that represents a new output class from the at least one cluster produced by the clustering algorithm; and
   retraining the pattern recognition classifier to include at least one new output class represented by the identified at least one cluster.

14. The method of claim 13, wherein executing a clustering algorithm comprises executing a k-means clustering algorithm.

15. The method of claim 13, wherein the at least one new output class comprises at least one output class that represents a common noise pattern, such that retraining the pattern recognition classifier to recognize the common noise pattern allows the pattern recognition classifier to recognize and discard input patterns comprised of the common noise pattern.

16. The method of claim 13, wherein identifying at least one cluster representing a new output classes includes subjecting the clustered pattern samples to a computerized verification process.

17. The method of claim 13, wherein the identifying clusters representing new pattern classes includes outputting them to a human operator.

18. The method of claim 13, further comprising:
   determining if the set of rejected input patterns is sufficiently large to perform a clustering algorithm; and
   executing the clustering algorithm if the set of rejected input patterns is sufficiently large.

19. The method of claim 13, wherein at least one of the output classes associated with the pattern recognition classifier represents a variety of postal indicia.

20. The method of claim 13, wherein classifying the plurality of input patterns at the pattern recognition classifier comprises classifying the plurality of input samples at a Bayesian Mahalanobis distance classification system.

* * * * *